United States Patent
Oettinger et al.

(10) Patent No.: US 7,215,888 B2
(45) Date of Patent: May 8, 2007

(54) SYSTEM AND METHOD OF IMPLEMENTING VARIABLE LOOP GAIN IN AN OPTICAL WIRELESS LINK BASED ON DISTANCE

(75) Inventors: Eric G. Oettinger, Rochester, MN (US); Mark D. Heminger, Rochester, MN (US); Mark D. Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 688 days.

(21) Appl. No.: 10/103,401

(22) Filed: Mar. 21, 2002

(65) Prior Publication Data

US 2003/0180052 A1 Sep. 25, 2003

(51) Int. Cl.
*H04B 10/00* (2006.01)

(52) U.S. Cl. .................. 398/119; 398/127; 398/137

(58) Field of Classification Search ............. 398/119, 398/129, 131, 137, 130, 127; 359/119
See application file for complete search history.

(56) References Cited

U.S. PATENT DOCUMENTS

| | | | |
|---|---|---|---|
| 6,381,055 B1 * | 4/2002 | Javitt et al. ............ 398/131 |
| 6,498,668 B1 * | 12/2002 | Korevaar ............... 398/129 |
| 6,600,553 B1 * | 7/2003 | Stone ................ 356/4.01 |
| 6,618,133 B2 * | 9/2003 | Hedges et al. .......... 356/141.4 |
| 6,721,510 B2 * | 4/2004 | Graves et al. ........... 398/129 |
| 6,747,813 B2 * | 6/2004 | Wakai et al. ............ 359/726 |
| 6,748,177 B1 * | 6/2004 | Upton ................ 398/129 |
| 6,775,480 B1 * | 8/2004 | Goodwill .............. 398/158 |
| 6,813,466 B1 * | 11/2004 | Kopecky .............. 399/351 |
| 6,856,437 B2 * | 2/2005 | Witt et al. ............. 359/198 |
| 6,862,131 B2 * | 3/2005 | Masuda ............... 359/326 |
| 7,016,612 B1 * | 3/2006 | Ikeda et al. ............ 398/137 |
| 2003/0175031 A1 * | 9/2003 | Shikakura et al. ........ 398/118 |

\* cited by examiner

*Primary Examiner*—Kenneth Vanderpuye
*Assistant Examiner*—Ken Malkowski
(74) *Attorney, Agent, or Firm*—William B Kempler; W. James Brady; Frederick J. Telecky, Jr.

(57) ABSTRACT

A system and method of varying the control loop gain of an optical wireless communication link between a transmitting station and a receiving station as an inverse function of distance between the transmitting station and the receiving station to allow the optical wireless communication link to be used reliably over a wide range of distances.

15 Claims, 1 Drawing Sheet

SYSTEM AND METHOD OF IMPLEMENTING VARIABLE LOOP GAIN IN AN OPTICAL WIRELESS LINK BASED ON DISTANCE

BACKGROUND OF THE INVENTION

1. Field of the Invention

This invention relates generally to techniques of controlling loop gain, and more particularly, to a system and method of controlling loop gain in an optical wireless link based on distance.

2. Description of the Prior Art

An optical wireless link system consists of two stations: a transmitter and a receiver. The transmitter is able to change the direction of its transmitted beam by known amounts of angular displacement. The receiving station sees this motion and sends position correction information back to the transmitter. The amount of motion seen by the receiver depends on the spacing between the transmitting and receiving stations. The amount of beam motion will vary by a factor of 50 for units whose range can vary from 1 to 50 meters. The loop gain of the control system will likewise vary by that same factor of 50. This gain variation is well beyond the range that typical control techniques known in the art can handle while maintaining optimal performance. Setting the gains for use at short range will result in an unstable system when used at long range. Using the long range gains at close distance will render sluggish system response. In view of the foregoing, it would be desirable and advantageous in the optical wireless communication art to provide a technique that allows an optical wireless communication link to be used reliably over a wide range of distances.

SUMMARY OF THE INVENTION

The present invention is directed to a system and method of varying the control loop gain of an optical wireless communication link between a transmitting station and a receiving station as an inverse function of distance between the transmitting station and the receiving station to allow the optical wireless communication link to be used reliably over a wide range of distances.

In one aspect of the invention, a method of varying the loop gain in an optical wireless link is based on an inverse function of distance between the transmitting station and the receiving station wherein the distance is based on a prior knowledge of a system installer or operator.

In another aspect of the invention, a method of varying the loop gain in an optical wireless link is based on an inverse function of distance between the transmitting station and the receiving station wherein the distance wherein the distance is determined via a calibration procedure performed by the two stations.

BRIEF DESCRIPTION OF THE DRAWINGS

Other aspects, features and advantages of the present invention will be readily appreciated as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, an optical wireless link system consists of two stations: a transmitter and a receiver. The transmitter is able to change the direction of its transmitted beam by known amounts of angular displacement. The receiving station sees this motion as a linear displacement, and sends position correction information back to the transmitter. The amount of motion seen by the receiver depends on the spacing between the transmitting and receiving stations. The amount of beam motion will vary by a factor of 50 for units whose range can vary from 1 to 50 meters. The loop gain of the control system will likewise vary by that same factor of 50. This gain variation is will beyond the range that typical control techniques known in the art can handle while maintaining optimal performance. Setting the gains for use at short range will result in an unstable system when used at long range. Using the long range gains at close distance will render sluggish system response.

Figure 1:
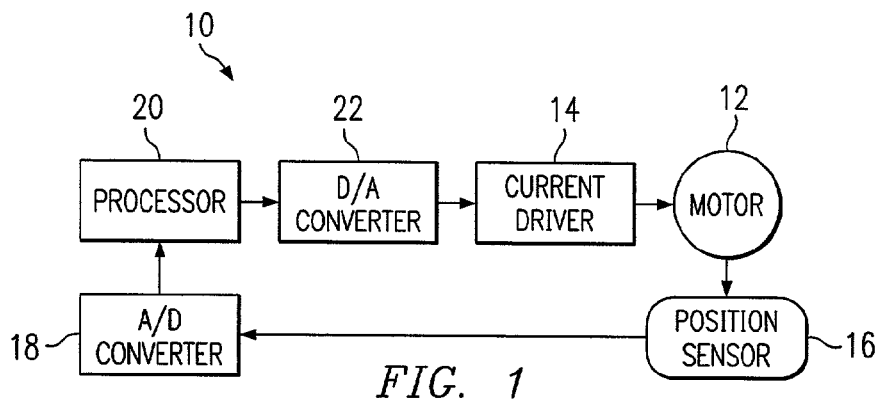
FIG. 1 is a block diagram of a digital position control system suitable for implementing a digital position control algorithm to vary loop gain in an optical wireless link based on an inverse function of distance according to one embodiment of the present invention.

Looking now at FIG. 1, a block diagram depicts a digital position control system 10 suitable for implementing a digital position control algorithm to vary loop gain in an optical wireless link based on an inverse function of distance between a transmitting station and a receiving station according to one embodiment of the present invention. Digital position control system 10 can be seen to have a Motor 12 that is responsive to a Current Driver 14 to change the direction of the beam transmitted by the transmitting station. A Position Sensor 16 is used to sense position characteristics associated with Motor 12 and generate analog signals therefrom. Those skilled in the art will readily appreciate that more than one Position Sensor 16 may be used to sense the requisite position characteristics associated with Motor 12. These analog signals are then processed via an A/D Converter 18 and then communicated to a data processing device (Processor) 20 such as a digital signal processor (DSP), micro-controller, computer, micro-computer, CPU, or any other data processing device capable of processing digital data in near real time. Subsequent to processing the digital signals generated by the A/D Converter 18, the Processor 20 communicates appropriate digital control data to a D/A Converter 22 where the digital control data is converted to analog control signals. The D/A Converter 22 then communicates the analog control signals to Current Driver 14 such that Current Driver 14 generates position control signals that operate to cause Motor 12 to change the direction of the beam transmitted by the associated transmitting station.

Figure 2:
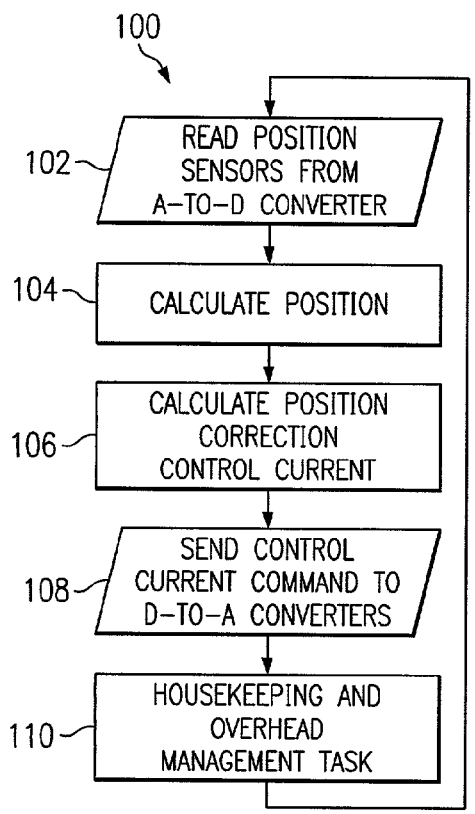
FIG. 2 is a flowchart illustrating a position control algorithm to vary loop gain in an optical wireless link based on an inverse function of distance, and that may be implemented via the digital position control system depicted in FIG. 1, according to one embodiment of the present invention.

FIG. 2 is a flowchart illustrating a position control algorithm 100 to vary loop gain in an optical wireless link based on an inverse function of distance between a transmitting station and a receiving station, and that may be implemented via the digital position control system 10 depicted in FIG. 1, according to one embodiment of the present invention. Analog data generated by Position Sensor(s) 16 is first converted to digital data via A/D Converter 18 and is then communicated to Processor 20 where the digital data is presented to a variable loop gain algorithm, also in accordance with one embodiment of the present invention as depicted in block 102. The variable loop algorithm calculates the present position characteristics associated with Motor 12 as depicted in block 104 and subsequently calculates a position correction control current as shown in block 106. Digital data corresponding to the position correction control current is then generated by the Processor 20 to adjust the control loop gain by the ratio $$Kdist=KNomDist*NomDist/Distance \quad (1)$$

where K represents a gain and Kdist is the gain based on the distance. Equation (1) is used to calibrate the gain (Kdist) based on a nominal gain (KnomDist) and a nominal distance (NomDist) to some new distance (Distance). The digital data corresponding to the position correction control current and generated by Processor 20 is sent to one or more D/A Converters 22 as shown in block 108. D/A converters 22 then convert the digital data to analog data necessary for Current Driver 14 to cause Motor 12 to readjust the direction of the beam transmitted by the transmitting station. The direction of the beam is then also adjusted as an inverse function of the distance between the transmitting station and the receiving station. This adjustment has been found by the present inventors to allow an optical wireless communication link to be used reliably at a much wider range of distances than that presently available using known systems and methods.

The Distance between the transmitting station and the receiving station can be determined using a priori knowledge provided by the system installer or operator as stated herein before. This information can be input using a communication interface device such as a computer. This information could also be input using switches or jumpers on the transmitting station.

The Distance between the transmitting station and the receiving station can also be determined using any appropriate calibration procedure performed by the two stations wherein they determine their Distance. One such calibration procedure is described in U.S. patent application Ser. No. 10/060,549, Texas Instruments Incorporated, entitled *Calibration Method for Station Orientation in an Optical Wireless Link*, filed on Jan. 30, 2002 by Hagen et al. And incorporated by reference in its entirety herein.

Figure 3:
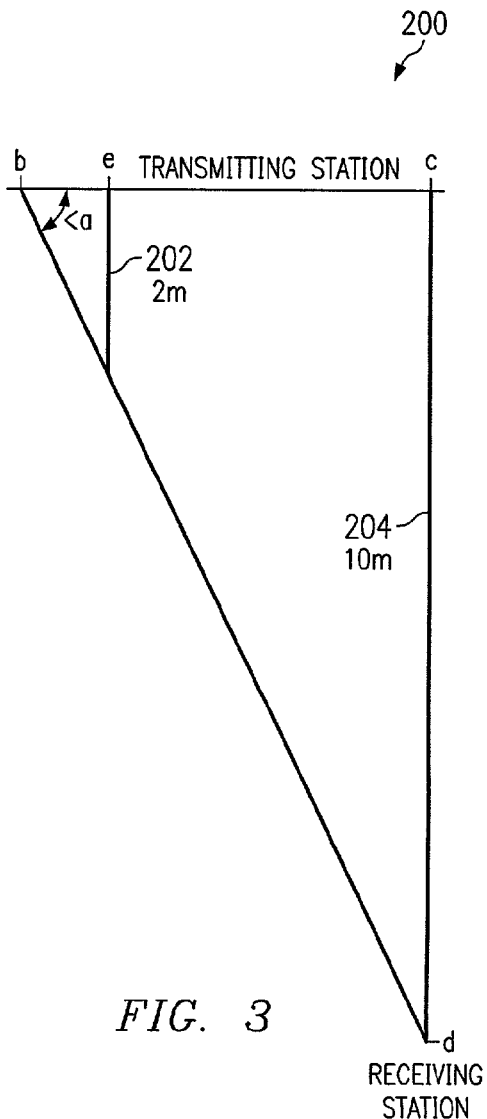
FIG. 3 illustrates a map showing that for a constant angle 'a' represented by line 'b'–'c' and line 'b'–'d', the vertical displacement from line 'b'–'c' to line 'b'–'d' changes linearly as the Distance between points 'b' and 'c'.

FIG. 3 illustrates a map 200 showing that for a constant angle 'a' represented by line 'b'–'c' and line 'b'–'d', the vertical displacement from line 'b'–'c' to a fixed point 'd' changes linearly as the Distance between points 'b' and 'c'. A first vertical displacement 202 is depicted at point 'e' as having a distance=2 meters. A second vertical displacement 204 is depicted at point 'c' as having a distance=10 meters. It can easily be seen therefore, that the second displacement 204 at point 'c' can be altered to be identical to the first displacement 202 by reducing angle 'a' by a factor of 5.

Keeping the above discussion and equation (1) in mind, varying the loop gain, Kdist, is now presented in detail below using exemplary numbers. A default value for the distance gain equal to 100 (KnomDist=100), for example, might be ideal at 25 meters (NomDist=25). System calibration would require an optimized gain based on the real operating distance. If the real operating distance (Distance) is 10 meters, the new gain, using equation (1), would then be: 100*(25/10)=250. This makes sense because at shorter distances, a greater mirror rotation is required to achieve the same deflection of the target point. Thus, rotation of a mirror associated with the optical wireless link can then be varied using the Motor 12 discussed above with reference to FIG. 1.

In summary explanation, providing a variable loop gain in an optical wireless link based on distance according to the embodiments set forth above is a two step procedure. Step 1 entails determination of the Distance between the transmitting station and the receiving station. Step 2 entails processing Distance data and angular displacement data associated with the direction of the transmitted beam to vary the control loop gain of the optical wireless link between the transmitting station and the receiving station as an inverse function of Distance such that the optical wireless link can be used reliably over a wider range of distances than that achievable using known optical wireless systems and techniques.

In view of the above, it can be seen the present invention presents a significant advancement in the art of optical wireless link control techniques. Further, this invention has been described in considerable detail in order to provide those skilled in the optical wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of varying loop gain in an optical wireless link, the method comprising the steps of:
    calibrating the optical wireless link to generate a default loop gain, KnomDist, for a first operating distance between a transmitting station and a receiving station;
    determining a real operating distance between the transmitting station and the receiving station; and
    calibrating the optical wireless link to generate an optimized loop gain, Kdist, as a function of the default loop gain, the first operating distance, and the real operating distance wherein the optimized loop gain, Kdist, is generated according to the relationship Kdist=KNomDist*NomDist/Distance, where KnomDist is the default loop gain for the first operating distance between the transmitting station and the receiving station, NomDist is the first operating distance between the transmitting station and the receiving station, and Distance is the real operating distance between the transmitting station and the receiving station.

2. The method according to claim 1 further comprising the step of causing rotation of a motor to vary in response to changes in the optimized loop gain caused by changes in the real operating distance between the transmitting station and the receiving station.

3. The method according to claim 1 wherein the step of determining a real operating distance between the transmitting station and the receiving station comprises formulating the real operating distance using a priori knowledge provided by a system installer or operator.

4. The method according to claim 1 wherein the step of determining a real operating distance between the transmitting station and the receiving station comprises formulating the real operating distance using a predetermined calibration procedure performed by the transmitting station and the receiving station.

5. A method of controlling loop gain in an optical wireless link formed between a transmitting station and a receiving station, the method comprising the steps of:
   calibrating the optical wireless link to generate a nominal loop gain associated with a nominal operating distance between the transmitting station and the receiving station;
   determining a real operating distance between the transmitting station and the receiving station;
   calibrating the optical wireless link to generate an optimized loop gain as a function of the nominal loop gain, the nominal operating distance, and the real operating distance; and
   causing rotation associated with a mirror rotation motor to vary in response to changes in the optimized loop gain caused by changes in the real operating distance between the transmitting station and the receiving station wherein the optimized loop gain is generated according to the relationship Kdist=KNomDist*NomDist/Distance where Kdist is the optimized loop gain, KnomDist is the nominal loop gain associated with the nominal operating distance between the transmitting station and the receiving station, NomDist is the nominal operating distance between the transmitting station and the receiving station, and Distance is the real operating distance between the transmitting station and the receiving station.

6. The method according to claim 5 wherein the step of determining a real operating distance between the transmitting station and the receiving station comprises the step of using a priori knowledge provided by a system installer or operator to formulate the real operating distance.

7. The method according to claim 5 wherein the step of determining a real operating distance between the transmitting station and the receiving station comprises the step of using a predetermined calibration procedure performed by the transmitting station and the receiving station.

8. A system for controlling loop gain in an optical wireless link formed between an optical transmitting station and an optical receiving station comprising:
   a mirror rotation motor;
   at least one position sensor operational to sense rotation caused by the mirror rotation motor and generate position data thereof;
   a data processing device in communication with the mirror rotation motor and the at least one position sensor; and
   an algorithmic software directing the data processing device, wherein the position data is supplied to the data processing device such that the data processing device, directed by the algorithmic software, is operational to generate optimized loop gain data as in inverse function of distance between the transmitting station and the receiving station, and further wherein the mirror rotation motor is operational to rotate a mirror in response to the optimized loop gain data wherein the algorithmic software is implemented according to the relationship Kdist=KNomDist*NomDist/Distance, where Kdist is the optimized loop gain, KnomDist is a nominal loop gain associated with a nominal operating distance between the transmitting station and the receiving station, NomDist is a nominal operating distance between the transmitting station and the receiving station, and Distance is the real operatinci distance between the transmitting station and the receiving station.

9. The system according to claim 8 further comprising:
   at least one A/D converter operational to convert analog data generated by the at least one position sensor into digital data and communicate the digital data to the data processing device;
   at least one D/A converter operational to convert the optimized loop gain data generated by the data processing device into analog signals; and
   a current driver operational to convert the analog signals into motor driver signals such that the mirror rotation motor is responsive to rotate a mirror in response to the motor driver signals.

10. A system for controlling loop gain in an optical wireless link formed between an optical transmitting station and an optical receiving station comprising:
   rotating means for rotating a mirror;
   sensing means for sensing rotation caused by the rotating means to generate position data thereof;
   data processing means in communication with the rotating means and the sensing means for processing the position data; and
   an algorithmic software directing the data processing means, wherein the position data is supplied to the data processing means such that the data processing means, directed by the algorithmic software, is operational to generate optimized loop gain data as in inverse function of distance between the transmitting station and the receiving station, and further wherein the rotating means is operational to rotate a mirror in response to the optimized loop gain data wherein the algorithmic software is defined according to the relationship Kdist=KNomDist*NomDist/Distance, where Kdist is an optimized loop gain, KnomDist is a nominal loop gain associated with a nominal operating distance between the transmitting station and the receiving station, NomDist is a nominal operating distance between the transmitting station and the receiving station, and distance is the real operating distance between the transmitting station and the receiving station.

11. The system according to claim 10 wherein the data processing means is selected from the group consisting of a DSP, CPU, micro-controller, micro-computer, and a computer.

12. The system according to claim 10 further comprising means for retrieving and communicating the real operating distance (Distance) to the data processing means, wherein the retrieving and communicating means is operational to store a priori knowledge provided by a system installer or operator.

13. The system according to claim 12 wherein the means for retrieving and communicating the real operating distance (Distance) is selected from the group consisting of switches, jumpers, and a data processing device interface.

14. The system according to claim 13 further comprising means for determining the real operating distance (Distance) and communicating the real operating distance to the data processing means in near real time.

15. The system according to claim 10 wherein the data processing means comprises:
   a data processing device selected from the group consisting of a DSP, CPU, micro-controller, micro-computer, and a computer;
   at least one A/D converter operational to convert analog data generated by the sensing means to digital data for use by the data processing device to generate the optimized loop gain data;
   at least one D/A converter operational to convert the optimized loop gain data to analog signals; and
   a current driver operational to convert the analog signals to current driver signals, wherein the rotating means is responsive to the current driver signals to rotate a mirror in response to the optimized loop gain data.

* * * * *